United States Patent Office 2,898,865
Patented Aug. 11, 1959

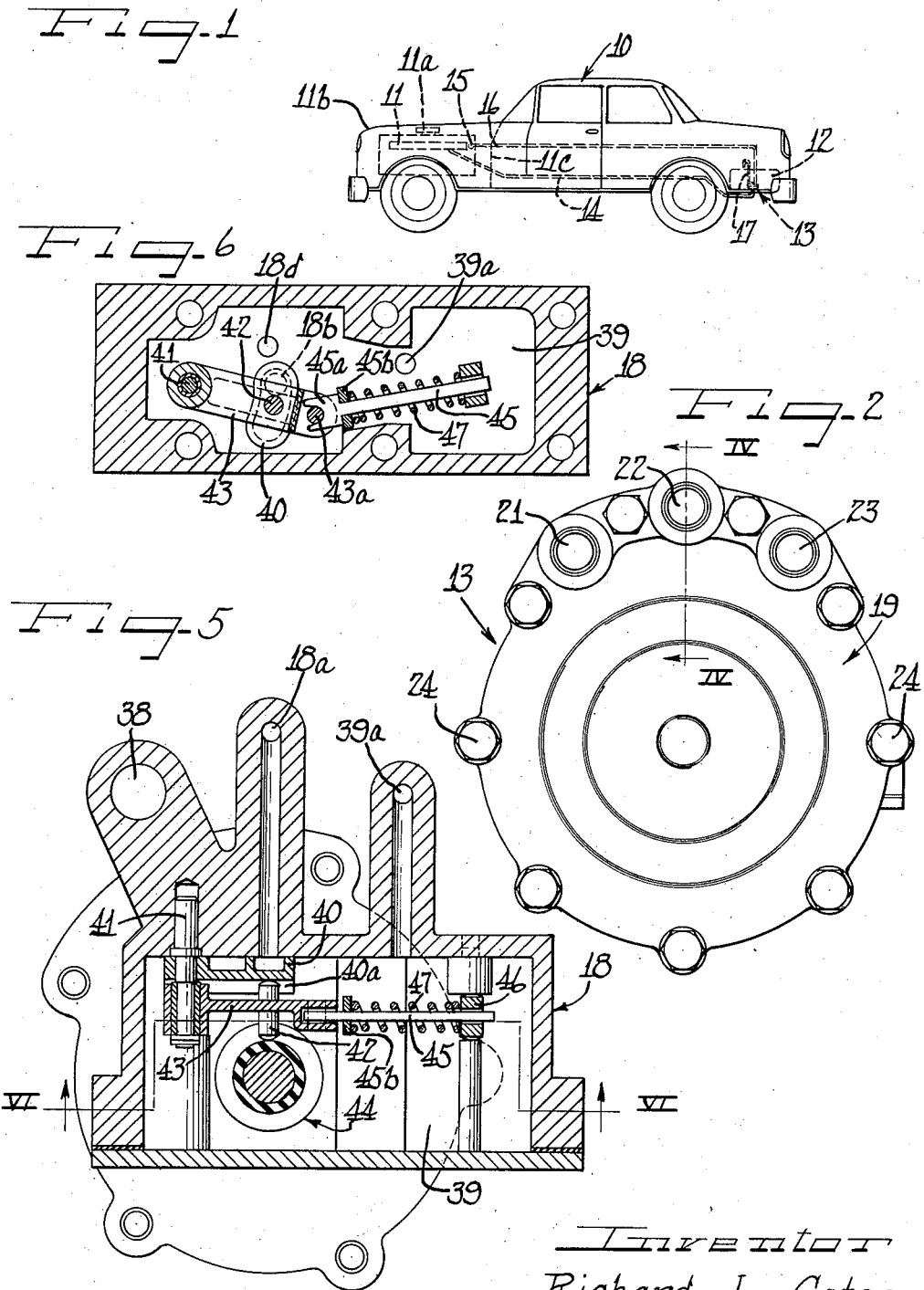

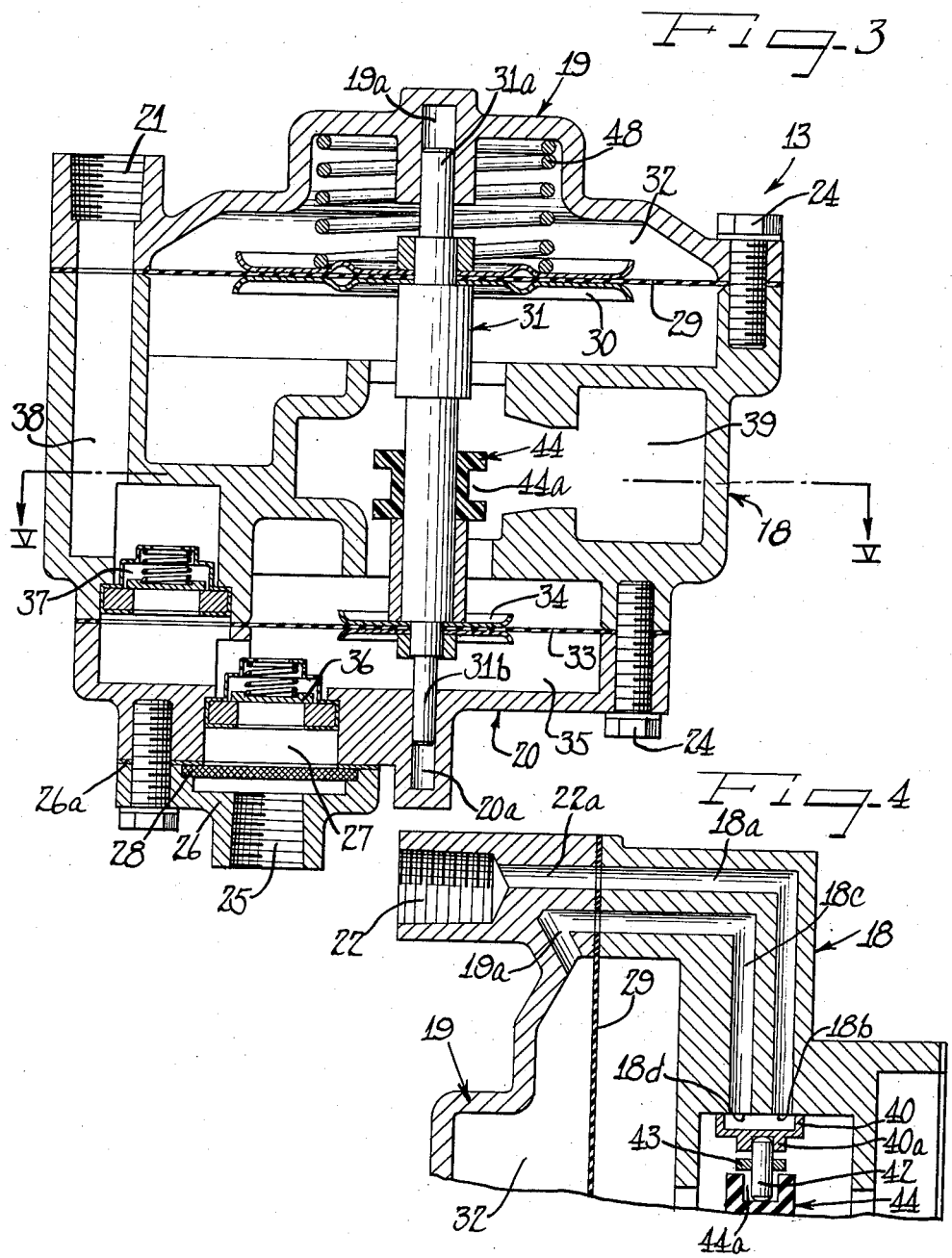

2,898,865

VACUUM DRIVEN AUTOMOTIVE FUEL PUMP

Richard L. Gates, Cleveland, Ohio, assignor to Thompson Ramo Wooldridge Inc., a corporation of Ohio Application June 7, 1955, Serial No. 513,643

9 Claims. (Cl. 103—152)

This invention relates to improvements in a fuel pump arrangement for internal combustion engines or the like, and more particularly to a fuel pump system adapted for use with automotive vehicles, wherein the fuel pump is independently driven by a vacuum supply and is located at a point remote from the engine, although other uses and purposes may be apparent to one skilled in the art.

More specifically, the present invention deals with a fuel pump for automotive vehicles and the like, wherein the pump is driven by an engine generated vacuum supply and is submerged in the fuel tank of a vehicle.

Automotive engine driven fuel pumps heretofore known have been generally objectionable as to vapor locking tendencies at elevated under-hood temperatures. Vapor locking tendencies are increasing due to a number of causes. Modern styling decrees lower hoods, V-type engines have hotter manifolds and exhaust pipes than in-line engines, silencing materials are secured to the underside of the hood such as fiber glass mats which function as insulation. Consequently, near oven-like under-hood temperatures are present in the operating environment of a conventional fuel pump.

Newer types of fuels contain more volatile materials to conserve the petroleum. Accordingly, to handle sufficient solid fuel for the expected vapor handling demand in the ordinary engine driven pump, the unit would have to be several times its present size, prohibitively costly and too large as to conveniently fit adjacent the engine.

It is an object of the present invention to provide a fuel system for an automotive vehicle which overcomes the deficiencies of the prior art and which specifically solves the problem of pumping fuel efficiently for automotive vehicles having increased under-hood temperatures.

It is also an object of this invention to provide a pump driven from a vacuum source which may be economically manufactured.

Another object of this invention resides in the provision of a vacuum driven fuel pump for automotive vehicles and the like wherein vapor locking tendencies are substantially eliminated.

A further object of this invention is to provide a fuel system for automotive vehicles and the like having a vacuum driven fuel pump submerged in the fuel tank of the vehicle which relieves the pump from being subjected to high underhood engine temperatures.

Still another object of this invention is to provide a vacuum driven fuel pump comprising a driving diaphragm and a fuel driven diaphragm, and means for intermittently venting both sides of the working diaphragm to the atmosphere.

Other objects, features, and advantages of the invention will be apparent from the following detailed disclosure, taken in conjunction with the accompanying sheets of drawings, wherein like reference numerals refer to like parts, in which:

Figure 1 is an elevational view of an automobile, illustrating a fuel system arrangement in accordance with the invention;

Figure 2 is a top plan view of the vacuum fuel pump utilized in the fuel system arrangement of the present invention as shown in Fig. 1;

Figure 3 is an enlarged vertical sectional view of the pump in Figure 2, with parts in elevation and some parts removed, taken to illustrate in one figure the fuel flow through the pump and other internal working parts;

Figure 4 is an enlarged fragmentary sectional view, with some parts removed, taken substantially along line IV—IV of Figure 2;

Figure 5 is a cross sectional view of the vacuum pump taken substantially along a horizontal plane of line V—V on Figure 3 through the middle of the pump and showing some parts in plan elevation; and Figure 6 is a sectional view, with parts in elevation, taken substantially along line VI—VI of Figure 5.

Referring to Figure 1, an automotive vehicle generally designated by the numeral 10, includes an engine 11 having a fuel metering device 11a, a fuel tank 12, a fuel pump 13 submerged in the fuel tank 12, a fuel line 14 connecting the fuel pump with the fuel metering device 11a on the engine, an engine driven vacuum pump 15 for providing a vacuum supply, a vacuum line 16 connecting the vacuum pump 15 with the vacuum driven fuel pump 13, and a vent pipe 17 leading upwardly from the pump 13 out of the fuel tank 12 and being open to the atmosphere.

The engine 11 is enclosed in a motor compartment formed by the hood assembly 11b. It will be understood that the motor compartment is isolated from the remaining body structure of the vehicle by a fire wall 11c. The insulative properties of the hood assembly 11b and the fire wall 11c may be improved in the usual manner by the use of thermal insulating materials. Thus, normal operating temperatures in the motor compartment will be considerably elevated over ambient temperature values. According to the present invention the pump 13 is located remotely from the motor compartment, even though the motive power for actuating the pump is generated by or derived from components of the engine 11 contained within the compartment.

Referring to Figures 2–6, the vacuum driven fuel pump 13 of this invention includes a sectional casing or housing having an intermediate section 18, a head or upper end section 19, and a lower end section 20.

In the head end 19 of the pump casing, a fuel outlet or discharge port 21 is connected with fuel line 14 to the engine 11. A vacuum inlet port 22 connects the vacuum line 16 to the vacuum source 15 on the engine, and the vent 23 communicates the vent pipe or stack 17 to the atmosphere.

Each of the casing sections is suitably secured together by fasteners, such as stud bolts 24. A fuel inlet port 25 is formed in a flange 26 bolted to the lower end section 20 of the pump casing and is in registry with a fuel passageway 27 in said end section. An appropriate gasket 26a seals the contacting faces of the flange 26 and the end housing section 20, and a screen 28 between the flange 26 and end head section 20 filters out dirt and other undesirable foreign materials in the fuel.

As seen most clearly in Figure 3, a working diaphragm 29 is mounted in the head end of the pump casing and extends between the contacting faces of the intermediate casing section 18 and the bell-shaped head end section 19. Thus, the diaphragm further serves as a gasket for these joining sections. A substantially circular protector or diaphragm retainer 30 comprises a pair of oppositely facing cup-shaped members abutting opposite sides of the diaphragm 29 and are centrally apertured to receive a stepped section of a reciprocating driving shaft 31.

The diaphragm 29 coacts with the head casing section 19 to define a working or vacuum chamber 32 which generally communicates with the vacuum inlet port 22 through an angular passageway as will be hereinafter explained.

The reciprocating driving shaft 31 carries end reduced sections 31a and 31b slidably received in bores 19a and 20a of the upper and lower casing sections 19 and 20, respectively. At the lower end of the housing, a fuel pumping diaphragm 33 is mounted at its peripheral edges between the joining surfaces of the lower end housing section 20 and the intermediate section 18 and also functions as a gasket between these elements, and is connected at its mid portion to the reciprocating shaft 31 through a protector or diaphragm retainer 34. Thus, the driving shaft 31 connects the working diaphragm 29 and the pumping diaphragm 33 for simultaneous operation.

The pumping diaphragm 33 coacts with the lower end housing section 20 to define a pumping chamber 35 which receives fuel from the fuel inlet port 25 through a normally closed inlet check valve 36 during the upward stroke of the pumping diaphragm 33. On the downward stroke of the pumping diaphragm, the inlet check valve 36 is closed and pressure is built up within the pumping chamber 35 to open a discharge check valve 37 from whence the fuel will pass through a discharge passageway 38 in the intermediate housing section which registers on one end with the pumping chamber 35 and at the other end with the fuel discharge port 21. Then the fluid will pass through the fuel line 14 to the engine 11.

The working diaphragm 29 and the pumping diaphragm 33 coact with the inner walls of the intermediate casing section 18 to define an intermediate chamber 39. This chamber is at all times vented to the atmosphere and communicates with the inlet venting port 23 through an angular passageway 39a, as seen in Figures 5 and 6.

The pump 13 is of the vacuum actuated type, a vacuum source 15 on the engine communicating through a vacuum line 16 with the vacuum inlet port 22 in the head section 19 of the casing. A short passageway 22a in the head housing section 19 connects a right angular passageway 18a in the intermediate housing section 18 to the venting or intermediate chamber 39 and terminates in a port 18b. The working chamber 32 communicates with the venting chamber 39 through an angular passageway 19a in the upper housing section 19 and an angular passageway 18c in the intermediate housing section 18, the latter passageway opening into the venting chamber 39 at port 18d.

Referring now particularly to Figures 4, 5 and 6, an elongated cup-shaped member 40 of a valve control assembly is pivotally mounted on a spindle 41, the latter being rigidly fixed in a thickened portion of intermediate casing 18. The swingable cup-shaped member 40, when in position as shown in Figure 4 coacts with the inner side wall of the adjacent casing to connect the vacuum port 18b and 18d for connecting the vacuum source to the working chamber 32. As seen in Figure 5, the swingable cup-shaped member 40 is provided with an axially extending groove 40a which slidably receives a pin member 42 carried by a swingable link 43 the latter being likewise pivotally journaled at one end on the spindle 41 as is the cup-shaped member. The free end of the pin 42 then is freely received within an annular groove 44a of an actuating spool 44 mounted on the reciprocating shaft 31.

As the shaft 31 reciprocates, the movable cup-shaped member 40 rocks on the spindle 41 by the force transmitted through the pin member 42 to alternately connect the vacuum ports 18b and 18d to load the working chamber 32 as shown in Figure 4 or to vent the working chamber 32 to the atmosphere by uncovering the vacuum port 18d as shown in Figure 6.

A position control link 45 is provided to quickly change the position of the cup-shaped member 40 during the reciprocation of the driving shaft 31 within the tolerances provided between the engagement of the pin member 42 and the grooved spool 44. The link 45 is slidably received at one end in a pivotally mounted guide member 46 and is provided at the other end with a substantially fork-like shaped socket 45a which pivotally engages a pin 43a fixed in a bifurcated end section of the actuating link 43. A stop member 45b is received at the enlarged end of the positioning link 45 to bottom a spring 47 which urges at its opposite end against the pivotal guide 46 for maintaining a positioning link 45 in constant engagement with the actuating link 43. Thus, when the links 43 and 45 pass a center position where the compression of the spring 47 is the greatest, the positioning link 45 snaps the cup-shaped member 40 into one of the selective positions to either connect the vacuum ports 18d and 18b or vent the vacuum port 18d to the venting chamber 39.

When the vacuum port 18d leading to the working chamber 32 is vented to the atmospheric venting chamber 39, the shaft 31 is forced in a downward direction by a spring 48 bearing at one end against the inner wall of the head end 19 of the pump casing and at the other end on the diaphragm retainer 30. When the shaft has moved downwardly a predetermined distance and caused the actuation link 43 to return the cup-shaped member 40 to the position illustrated in Figure 4 wherein the working chamber 32 is again connected to the vacuum source, the working diaphragm 29 will be biased upward against the action of the spring 48 within the limits prescribed by the guide end 31a bottoming against the end head casing section 19. The valve assembly vents the vacuum port 18d to the atmospheric chamber 39 whereupon the operating cycle is repeated.

It will be understood that modifications and variations may be effected without departing from the scope of the novel concepts of the present invention.

I claim as my invention:

1. A vacuum pump adapted to be powered from a supply of vacuum comprising a casing, a working diaphragm mounted at one end of said casing and coacting therewith to define a working chamber communicating with the supply of vacuum, a spring continually urging said diaphragm away from the adjacent end of the casing, a pumping diaphragm at the opposite end of said casing and coacting therewith to define a pumping chamber having an inlet and an outlet, said diaphragms coacting with said casing and together therewith forming an atmosphere vented chamber therebetween, a reciprocably guided shaft within said casing interconnecting said diaphragms to provide simultaneous operation thereof, and valve controlled passage means in said casing between venting and working chambers intermittently venting said working chamber with said atmosphere vented chamber thereby to reciprocatingly drive said pumping diaphragm to move liquid from said inlet to said outlet.

2. A vacuum pump adapted to be powered from a supply of vacuum comprising a casing, a working diaphragm mounted at one end of said casing and coacting therewith to define a working chamber communicating with the supply of vacuum, a spring continually urging said diaphragm away from the adjacent end of the casing, a pumping diaphragm at the opposite end of said casing and coacting therewith to define a pumping chamber having an inlet and an outlet, said diaphragms coacting with said casing and together therewith forming an atmosphere vented chamber therebetween, a reciprocably guided shaft within said casing interconnecting said diaphragms to provide simultaneous operation thereof whereby said pumping diaphragm moves fluid from said inlet to said outlet, an valve means interconnecting said vented and working chambers and actuated by the reciprocation of said shaft for intermittently venting said working chamber with said atmosphere vented chamber.

3. A vacuum pump adapted to be driven by a supply of vacuum comprising a casing, a working diaphragm mounted at one end of said casing and coacting therewith to define a working chamber communicating with the supply of vacuum, a spring for continually urging said diaphragm away from the end of said casing, a pumping diaphragm at the opposite end of said casing and coacting therewith to define a pumping chamber having an inlet and an outlet, an inlet check valve and a discharge check valve coacting with said pumping diaphragm to alternately fill the pumping chamber with liquid and discharge the liquid under pressure upon operation of said pumping diaphragm, said diaphragms coacting with said casing and together therewith forming a chamber vented to the atmosphere, a reciprocably guided shaft within said casing interconnecting said diaphragms to provide simultaneous operation thereof, and valve means interconnecting said vented and working chambers for intermittently venting said working chamber with said atmosphere vented chamber.

4. A vacuum pump adapted to pump fluids and to be driven by a vacuum supply including a fluid inlet, a fluid outlet, a vacuum inlet, and an atmospheric vent, which comprises a casing, a working diaphragm mounted at one end of said casing and coacting therewith to define a working chamber, said chamber communicating with said vacuum inlet, a spring for continually biasing said diaphragm away from the adjacent end of the casing, a fluid pumping diaphragm mounted at the opposite end of said casing and coacting therewith to define a fluid pumping chamber, said pumping chamber communicating with the fluid inlet and the fluid outlet, an inlet check valve between the fluid inlet and pumping chamber, a discharge check valve between the pumping chamber and the fluid outlet, a shaft reciprocably guided in said casing and fastened to each diaphragm providing simultaneous operation therebetween, said diaphragms coacting with said casing to define an intermediate chamber communicating with said atmospheric vent, passage means in said casing communicating said intermediate chamber with said atmospheric vent and with said working chamber, and valve means in control of said passage means for intermittently venting said working chamber to said atmospheric vent through said intermediate chamber.

5. A vacuum pump adapted to pump fluid and to be driven by a vacuum supply including a fluid inlet, a fluid outlet, a vacuum inlet, and an atmospheric vent, which comprises a casing, a working diaphragm mounted at one end of said casing and coacting therewith to define a working chamber, a spring for continually biasing said diaphragm away from the adjacent end of the casing, a fluid pumping diaphragm mounted at the opposite end of said casing and coacting therewith to define a fluid pumping chamber, said pumping chamber communicating with the fluid inlet and the fluid outlet, an inlet check valve between the fluid inlet and pumping chamber, a discharge check valve between the pumping chamber and the fluid outlet, a shaft reciprocably guided in said casing and fastened to each diaphragm for providing simultaneous operation therebetween, said diaphragms coacting with said casing to define an intermediate chamber, said chamber communicating with said atmospheric vent, said vacuum inlet, and a passageway leading to said working chamber, and valve means for intermittently connecting the passage leading to the working chamber with the vacuum inlet.

6. In a vacuum pump adapted to pump fluids and to be driven by a continuous vacuum supply including a fluid inlet, a fluid outlet, a vacuum inlet, and an atmospheric vent, a casing, a working diaphragm mounted at one end of said casing and coacting therewith to define a working chamber, a spring for continually biasing said diaphragm away from the adjacent end of the casing, a fluid pumping diaphragm mounted at the other end of the casing and coacting therewith to define a fluid pumping chamber, said pumping chamber communicating with said fluid inlet and said fluid outlet, a shaft reciprocably guided in said casing and rigidly fastened to each diaphragm to provide a driving connection therebetween, said diaphragms coacting with said casing to define an intermediate chamber, separate passageways in said casing intercommunicating said intermediate chamber with said vacuum inlet, said working chamber, and said atmospheric vent, and valve means in said intermediate chamber for alternately providing closed communication between said working chamber passageway and said vacuum inlet passageway and communication through an intermediate passageway between said working chamber passageway and said vent passageway.

7. In a vacuum pump adapted to pump fluids and to be driven by a continuous vacuum supply including a fluid inlet, a fluid outlet, a vacuum inlet, and an atmospheric vent, a casing, a working diaphragm mounted at one end of said casing and coacting therewith to define a working chamber, a spring for continually biasing said diaphragm away from the adjacent end of the casing, a fluid pumping diaphragm mounted at the other end of the casing and coacting therewith to define a fluid pumping chamber, said pumping chamber communicating with said fluid inlet and said fluid outlet, a shaft reciprocably guided in said casing and rigidly fastened to each diaphragm to provide a driving connection therebetween, said diaphragms coacting with said casing to define an intermediate chamber, separate passageways in said casing intercommunicating with said vacuum inlet, said working chamber, and said atmospheric vent, and an oscillatable cup-shaped member coacting with an inner casing wall to intermittently provide a connecting passageway between the vacuum inlet passageway and the working chamber passageway.

8. In a vacuum pump adapted to pump fluids and to be driven by a continuous vacuum supply including a fluid inlet, a fluid outlet, a vacuum inlet, and an atmospheric vent, a casing, a working diaphragm mounted at one end of said casing and coacting therewith to define a working chamber, a spring for continually biasing said diaphragm away from the adjacent end of the casing, a fluid pumping diaphragm mounted at the other end of the casing coacting therewith to define a fluid pumping chamber, said pumping chamber communicating with said fluid inlet and said fluid outlet, a shaft reciprocably guided in said casing and rigidly fastened to each diaphragm to provide a driving connection therebetween, said diaphragms coacting with said casing to define an intermediate chamber, separate passageways in said casing intercommunicating with said vacuum inlet, said working chamber, and said atmospheric vent, an oscillatable cup-shaped member coacting with an inner casing wall to intermittently provide a connecting passageway between the vacuum inlet passageway and the working chamber passageway, and linkage interconnecting said cup-shaped member and said reciprocating shaft for oscillating said member.

9. In a vacuum pump adapted to pump fluids and to be driven by a continuous vacuum supply including a fluid inlet, a fluid outlet, a vacuum inlet, and an atmospheric vent, a casing, a working diaphragm mounted at one end of said casing and coacting therewith to define a working chamber, a spring for continually biasing said diaphragm away from the adjacent end of the casing, a fluid pumping diaphragm mounted at the other end of the casing and coacting therewith to define a fluid pumping chamber, said pumping chamber communicating with said fluid inlet and said fluid outlet, a shaft reciprocably guided in said casing and rigidly fastened to each diaphragm to provide a driving connection therebetween, said diaphragms coacting with said casing to define an intermediate chamber, separate passageways in said casing intercommunicating with said vacuum inlet, said working chamber, and said atmospheric vent, an oscillatable cup-shaped member coacting with an inner casing wall to intermittently provide a connecting passageway between the vacuum inlet passageway and the working chamber passageway, linkage interconnecting said cup-shaped member and said reciprocating shaft for oscillating said member, a spool mounted on said shaft, and a link having a pin for transmitting movement from the spool carrying shaft to the cup-shaped member for oscillating the latter.

References Cited in the file of this patent

UNITED STATES PATENTS

| | | |
|---|---|---|
| 1,270,446 | Schulz | June 25, 1918 |
| 1,437,278 | Twombly | Nov. 28, 1922 |
| 1,458,485 | Huntley | June 12, 1923 |
| 1,663,611 | Redmond | Mar. 27, 1928 |
| 1,690,565 | Wheeler | Nov. 6, 1928 |
| 1,920,014 | Horton | July 25, 1933 |
| 1,974,850 | Horton | Sept. 25, 1934 |
| 2,084,605 | Webb | June 22, 1937 |
| 2,095,475 | Kittler | Oct. 12, 1937 |
| 2,285,163 | Knott | June 2, 1942 |
| 2,675,758 | Hughes | Apr. 20, 1954 |